(12) United States Patent
Suh et al.

(10) Patent No.: US 7,610,061 B2
(45) Date of Patent: Oct. 27, 2009

(54) COMMUNICATION DEVICE AND METHOD HAVING A COMMON PLATFORM

(75) Inventors: Woon-Sik Suh, Yongin-Si (KR); Jeon Taek Im, Ansung-Si (KR); Jin-Aeon Lee, Suwon-Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 53 days.

(21) Appl. No.: 10/813,327

(22) Filed: Mar. 30, 2004

(65) Prior Publication Data
US 2005/0066074 A1      Mar. 24, 2005

(30) Foreign Application Priority Data
Sep. 20, 2003    (KR)  .................. 10-2003-0065412

(51) Int. Cl.
*H04B 1/38*   (2006.01)
*H04M 1/00*   (2006.01)
*H04L 5/16*   (2006.01)
*G06F 13/36*  (2006.01)
*G06F 13/20*  (2006.01)

(52) U.S. Cl. .................. 455/557; 455/556.1; 375/222; 710/310; 710/312; 710/313

(58) Field of Classification Search .................. 455/557, 455/556.1; 375/222; 710/305, 310, 312, 710/313
See application file for complete search history.

(56) References Cited

U.S. PATENT DOCUMENTS

| | | | |
|---|---|---|---|
| 5,010,331 A * | 4/1991 | Dias et al. ................. | 340/5.28 |
| 5,777,991 A * | 7/1998 | Adachi et al. ............. | 370/352 |
| 5,872,940 A * | 2/1999 | Circello et al. ............ | 710/305 |
| 6,026,119 A * | 2/2000 | Funk et al. ................ | 375/222 |
| 6,101,566 A * | 8/2000 | Woods et al. .............. | 710/315 |
| 6,119,179 A * | 9/2000 | Whitridge et al. ......... | 710/72 |
| 6,353,863 B1 | 3/2002 | Nakagawa et al. | |

(Continued)

FOREIGN PATENT DOCUMENTS

CN      1171577      1/1998

(Continued)

OTHER PUBLICATIONS

German Office Action dated Jul. 13, 2009 in corresponding German Appln. No. 10 2004 046 612.2-53.

*Primary Examiner*—Nay A Maung
*Assistant Examiner*—Andrew Wendell
(74) *Attorney, Agent, or Firm*—F. Chau & Associates, LLC

(57) ABSTRACT

A communication device and method is provided, comprising: a signal modulator/demodulator having a digital signal processor for effecting radio communications; and an application processor (AP) having a central processing unit and a master controller for controlling via a common bus a plurality of peripherals including an interface with the signal modulator/demodulator, wherein a memory shared by the modem and the AP is controlled via the interface. The plurality of peripherals include at least one of an image capture module, a display, and a flash memory. The master controller controls the plurality of peripherals by issuing a packetized command commonly receivable by the plurality of peripherals over the common bus, the packetized command includes a module device select signal used for selecting one of the peripherals.

34 Claims, 15 Drawing Sheets

U.S. PATENT DOCUMENTS

| | | | |
|---|---|---|---|
| 6,378,102 B1* | 4/2002 | Watanabe et al. | 714/763 |
| 6,738,845 B1* | 5/2004 | Hadwiger et al. | 710/240 |
| 6,785,556 B2* | 8/2004 | Souissi | 455/557 |
| 6,874,054 B2* | 3/2005 | Clayton et al. | 710/310 |
| 6,915,142 B1* | 7/2005 | Wietfeldt | 455/557 |
| 6,968,218 B2* | 11/2005 | Petty | 455/572 |
| 7,062,588 B2* | 6/2006 | Usui et al. | 710/306 |
| 2001/0034246 A1* | 10/2001 | Hutchison et al. | 455/557 |
| 2002/0082043 A1* | 6/2002 | Wilska et al. | 455/550 |
| 2002/0166058 A1* | 11/2002 | Fueki | 713/194 |
| 2003/0114152 A1* | 6/2003 | Gibbs et al. | 455/419 |
| 2004/0203976 A1* | 10/2004 | Gupta et al. | 455/517 |
| 2004/0209643 A1* | 10/2004 | Welsh | 455/556.1 |
| 2004/0225760 A1* | 11/2004 | Lee | 710/22 |
| 2005/0066067 A1* | 3/2005 | Suh | 710/1 |
| 2006/0277424 A1* | 12/2006 | Ryan | 713/300 |

FOREIGN PATENT DOCUMENTS

| | | |
|---|---|---|
| EP | 0855643 | 7/1998 |
| EP | 0855643 A1 | 7/1998 |
| EP | 1011257 A1 | 6/2000 |
| JP | 2001339489 | 12/2001 |
| WO | WO 2004/003759 A1 | 1/2004 |

* cited by examiner

| Name | Signal Description |
|---|---|
| nCS | Chip Select signal, active low |
| CnD | Command Packet (High) or Data Packet (Low) |
| nRW | Transfer direction of the Data Pins (DIO) Master Write (High) or Read (Low) |
| CLK | Forwarded Clock, CMD & write-data packets are synchronized on this clock |
| DIO[3:0] | 4-bit bi-directional data bus |
| RESP | Returned Clock, read-data packets are synchronized on this clock |
| STAT | Response of the Slave device |

Fig.7

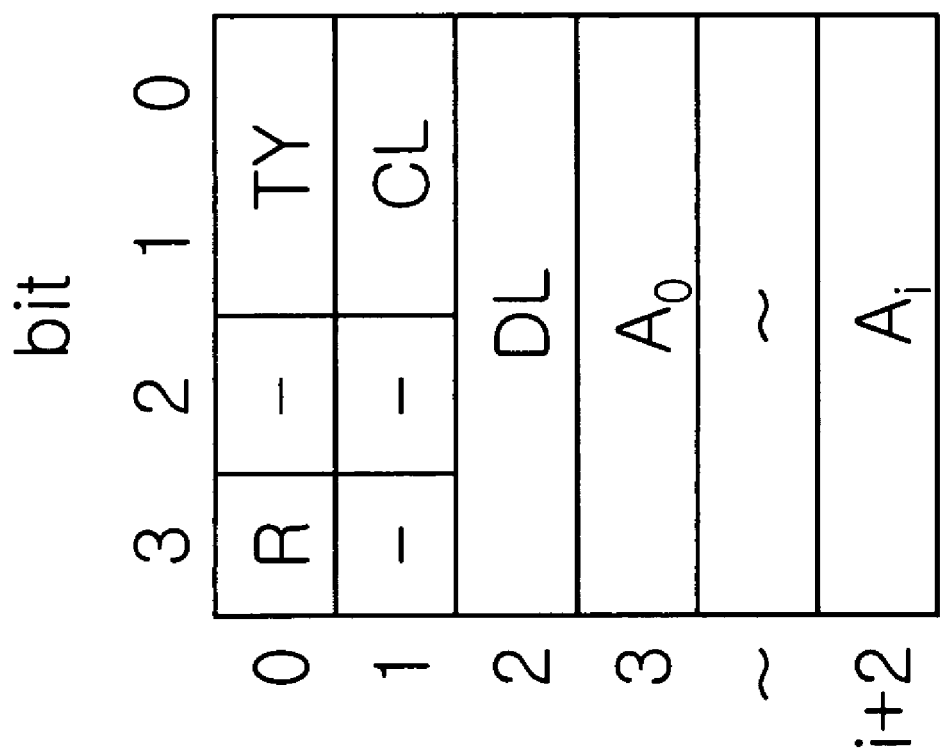

| Field Name | Width | Description |
|---|---|---|
| R | 1 | This field specifies the target of the current transaction. The master can access the internal registers of the slave device or the actual data which will be supplied by the slave device.<br>0 – Access normal data<br>1 – Access the internal register of the slave device |
| TY | 2 | This field specifies the type of the current transfer.<br>00 – Read Transfer    01 – Reserved<br>10 – Write Transfer   11 – Reserved |
| CL | 2 | This field specifies the length of the CMD Packet.<br>00 – 4 x 4-bit    01 – 8 x 4-bit<br>10 – 12 x 4-bit  11 – 16 x 4-bit |
| DL | 4 | This field specifies the size of the Data Packet.<br>Data-Packet Size = 2^DL bytes (1, 2 ~ 32,768 bytes) |
| $A_0 \sim A_i$ | 4 x (i+1) | These fields include the start address of the requested transfer |

Fig.9

| Address (byte) | Description |
|---|---|
| 0 | Manufacturer ID |
| 1 | Version Number |
| 2 | Device Type |
| 3 | |
| 4 | Max. Operational Frequency |
| 5 | Master Command |
| 6 | Internal Buffer Control |
| 7 | Read Buffer Pending–Transaction Count |
| 8 | Write Buffer Pending–Transaction Count |
| 9 | |
| A | Internal Buffer Size |
| B | Write Buffer Base Address |
| C | |
| D | Reserved |
| E | Transaction Error |
| F | |

Fig. 10

COMMUNICATION DEVICE AND METHOD HAVING A COMMON PLATFORM

BACKGROUND

1. Technical Field

The present invention relates to a communication device and method; in particular, a communication device and method having a plurality of processors and applications which operate under a common platform.

2. Discussion of Related Art

Recent advances in semiconductor, wireless, and software technologies make available a multitude of applications operable from mobile communication devices such as cellular phones and PDAs. For example, handheld phones used for wireless communication are also usable as PDAs, cameras, game play devices, etc. These applications were available previously as separate standalone devices. In these multi-application communication devices, there are usually at least two integrated circuit chips, each with one or more processing devices. One of the two chips serves as a modulator/demodulator ("modem"). The modem chip includes a digital signal processor ("DSP") for signal processing purposes to effect wireless communications with base stations or other communication devices. The other chip is an application processor ("AP"), having a central processing unit ("CPU") to operate functions and peripherals such as camera or image capture, display, 2D/3D engine/memory, database, etc. Because each application or peripheral operates with a different platform, the CPU communicates with each of the applications and peripherals through interfaces which are distinct and specific to the respective application. The different interfaces are usually embedded within the AP chip. Each of the AP and modem chips in the communication device has respective local memory for data and program storage, controlled by its respective processor. Each of the AP and modem chips also runs its respective operating system or platform. Communications between the AP and the modem chips are made through a shared memory and respective interfaces.

FIG. 1 shows a simplified block diagram of a conventional communication device having the above described configuration, with a modem chip and an application processor chip for operating application or peripheral devices such as a camera, an LCD display, RAM and ROM. A dual-port SRAM serves as the shared memory for facilitating communication between the AP and modem chips. Each chip has its respective memory controllers for controlling the local RAM and ROM and the shared memory.

FIG. 2 shows a more detailed block diagram of the conventional communication device of FIG. 1. As shown, the AP chip 110 includes a CPU 111 for controlling peripheral devices such as LCD module 120, camera module 130, and memory module 140. Because each application/peripheral has its own operating system, there must be separate interfaces or control units for respective applications, such as LCDC 113 for controlling the LCD module 120, CAM controller 115 for controlling the camera module 130, and memory controller 117 for controlling memory module 140. Further, each application connects to the AP chip 110 through different buses at different pinouts of the chip. As an example, the LCD module 120 requires a 30-pin bus connection to the LCDC 113, the camera module 130 requires a 20-pin bus connection to camera control unit 115, and the memory module 140 requires a 50-pin bus connection to memory controller 117.

The modem chip 150 includes a DSP 155 and coprocessor 151 for effecting radio communication functions. The DSP 155 communicates with coprocessor 151 through internal interface 153. The modem chip 150 connects to an external memory module 160 via a memory controller 157. Communication between the AP chip 110 and modem chip 150 is by interface line 170, via a shared memory (not shown). Individual memory controllers 119 and 159 are disposed within respective AP chips 110 and modem chip 150 to independently access through respective ports of the dual port shared memory.

In mobile devices such as a cellular phone with multiple applications such as that shown in FIGS. 1 and 2, the physical size of the AP chip 110 is comparatively large because of the requirement for the large number of pinouts and the different busses and interfaces. Also, operation of multiple applications with different platforms requires constant processing by the CPU 111, therefore, power consumption would be relatively high.

A need therefore exists for a mobile communication device and method having multiple applications which minimizes physical size and power consumption.

SUMMARY OF THE INVENTION

According to an aspect of the present invention, a communication device is provided, comprising: a signal modulator/demodulator having a digital signal processor for effecting radio communications; and an application processor (AP) having a central processing unit and a master controller for controlling via a common bus a plurality of peripherals including an interface with the signal modulator/demodulator, wherein a memory shared by the modem and the AP is controlled via the interface. The shared memory is preferably an SDRAM. The plurality of peripherals include at least one of an image capture module, a display, and a flash memory.

Preferably, the master controller controls the plurality of peripherals by issuing a packetized command commonly receivable by the plurality of peripherals over the common bus, the packetized command includes a module device select signal used for selecting one of the peripherals, wherein the selected one of the peripherals returns a signal to the master controller to acknowledge receipt of the packetized command, wherein the packetized command includes a read/write command to a memory shared by the modem and the AP, and data read from the shared memory is sent to the AP with a strobe signal, the strobe signal is used for strobing the data read into a register in the master controller.

The SDRAM includes a plurality of data banks and an interface for interfacing the master controller. The SDRAM also includes a protection circuit for receiving address data from the AP and the modem and for generating a protect signal upon receiving the same address from the modem and the AP.

According to another embodiment of the present invention, a communication device is provided, comprising: a signal modulator/demodulator having a digital signal processor for effecting radio communications; and an application processor (AP) having a central processing unit and a master controller for controlling via a first bus at least one peripheral and via a second bus a memory shared by the modem and the AP, wherein the master controller further controls via the second bus a flash memory. According to an alternative embodiment, the at least one peripheral is an image capture module.

According to still another embodiment of the present invention, an application processor (AP) for use in a communication device is provided, the application processor comprises: a central processing unit for processing data received from a plurality of peripherals; and a master controller for controlling via a common bus the plurality of peripherals and for interfacing with a signal modulator/demodulator (modem) via the common bus.

Preferably, the communication device further includes a memory, the memory being shared by the modem and the AP, wherein the shared memory is an SDRAM. The plurality of peripherals include at least one of an image capture module, a display, and a flash memory. The master controller controls the plurality of peripherals by issuing a packetized command commonly receivable by the plurality of peripherals over the common bus, the packetized command includes a module device select signal used for selecting one of the peripherals, wherein the selected one of the peripherals returns a signal to the master controller to acknowledge receipt of the packetized command.

According to still another aspect of the present invention, an application processor (AP) for use in a communication device is provided, the application processor comprises: a central processing unit for processing data received from a plurality of peripherals; and a master controller for controlling via a first bus the plurality of peripherals and for interfacing with a signal modulator/demodulator (modem) via a second bus.

The communication device further includes a memory, the memory being shared by the modem and the AP, wherein the shared memory is an SDRAM, wherein the plurality of peripherals include at least one of an image capture module, a display, and a flash memory. Preferably, the master controller controls the plurality of peripherals by issuing a packetized command commonly receivable by the plurality of peripherals over the common bus, the packetized command includes a module device select signal used for selecting one of the peripherals.

A method is also provided for controlling a communication device having a signal modulator/demodulator (modem) for effecting radio communications and an application processor (AP) having a central processing unit and a master controller, comprising: controlling via a common bus in the master controller a plurality of peripherals; and interfacing with the signal modulator/demodulator (modem) via the common bus, wherein the step of interfacing includes interfacing a memory shared by the modem and the AP, wherein the step of controlling includes controlling at least one of an image capture module, a display, and a flash memory and the shared memory is an SDRAM.

Preferably, the step of controlling includes issuing a packetized command commonly receivable by the plurality of peripherals over the common bus, the packetized command includes a module device select signal used for selecting one of the peripherals, wherein the selected one of the peripherals returns a signal to the master controller to acknowledge receipt of the packetized command.

BRIEF DESCRIPTION OF THE DRAWINGS

FIG. 7 shows a definition listing for the signals used by the bus master controller of FIG. 4;

FIG. 8 shows an illustrative structure of a command packet issued by the bus master controller of FIG. 4;

FIG. 9 is a definition listing of a command packet field;

FIG. 10 shows an illustrative internal register definition of a slave device;

DETAILED DESCRIPTION OF PREFERRED EMBODIMENTS

Figure 1:
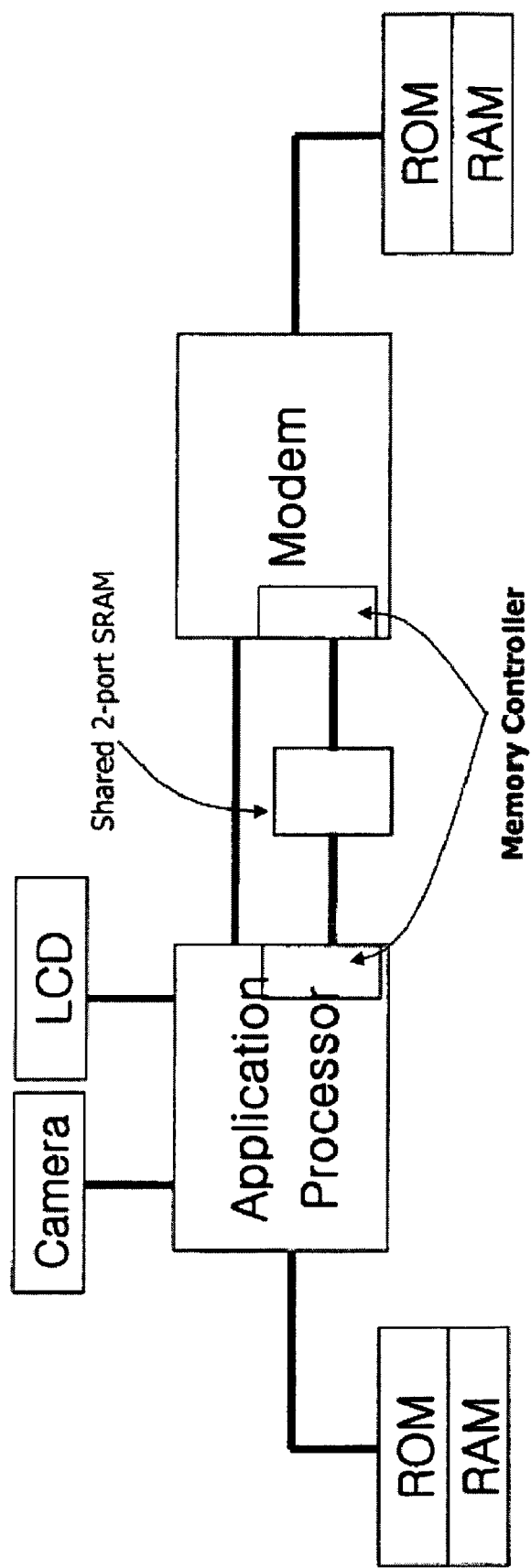
FIG. 1 shows a simplified block diagram of a conventional communication device.
Figure 2:
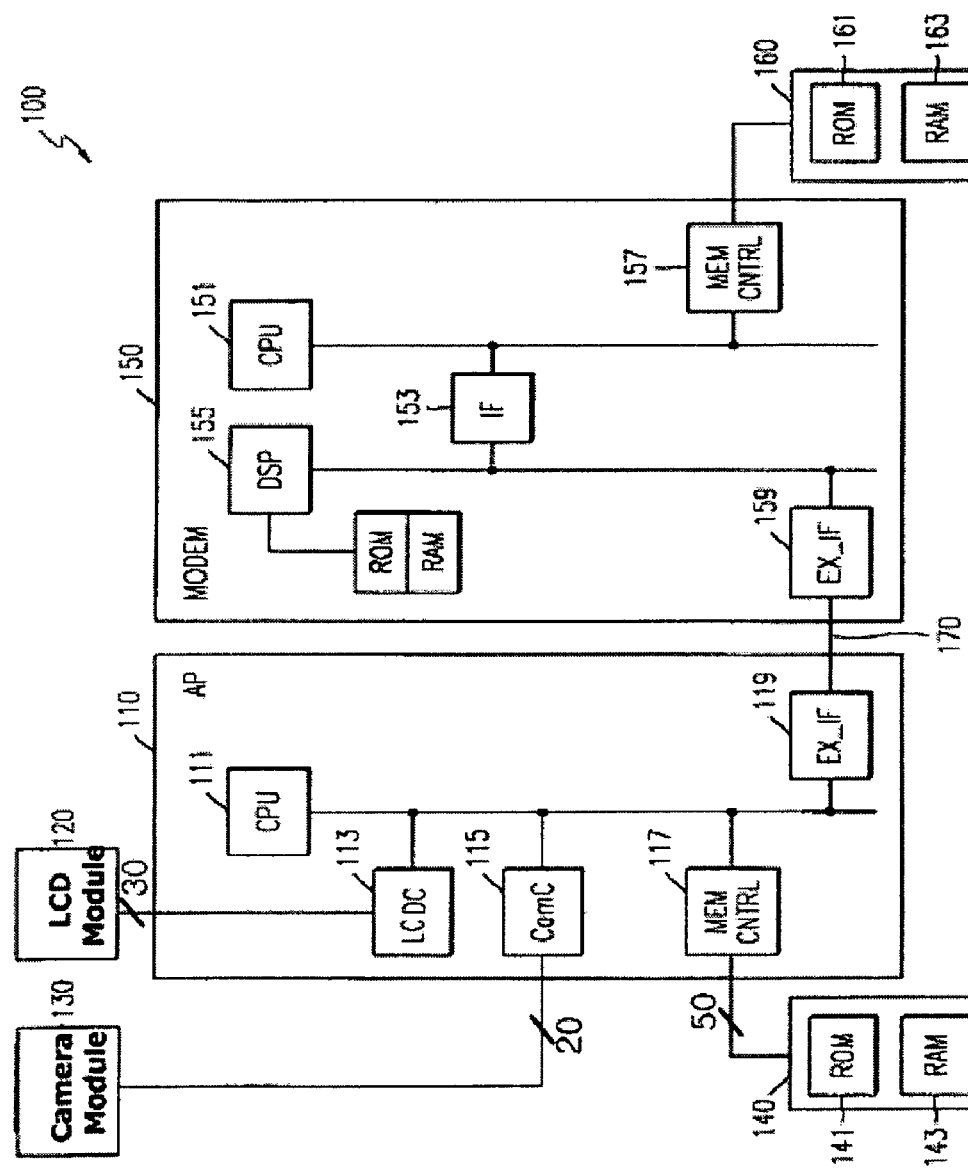
FIG. 2 shows a detailed block diagram of the conventional communication device of FIG. 1.
Figure 3:
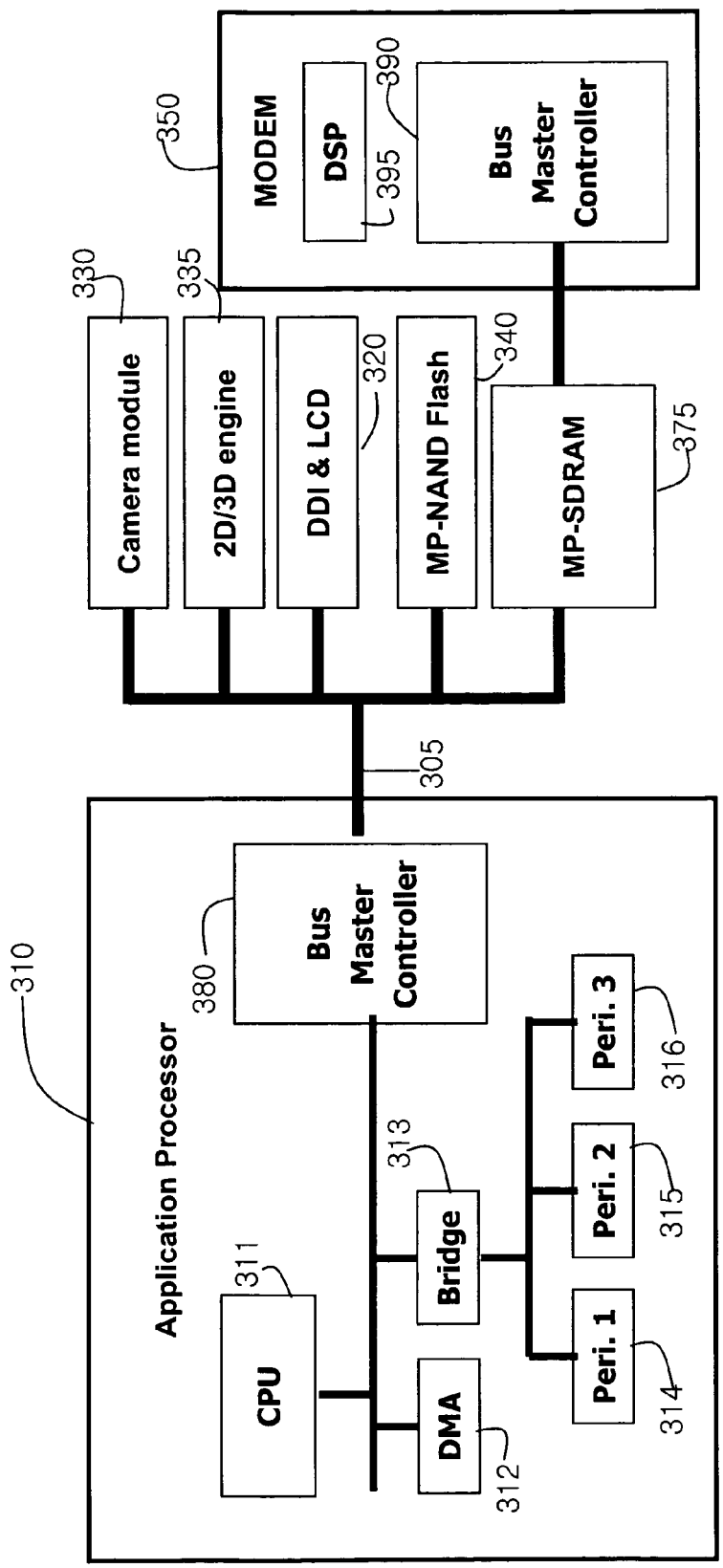
FIG. 3 shows a block diagram of a communication device according to a preferred embodiment of the present invention.

According to embodiments of the present invention, multiple applications of a mobile communication device are run from the AP chip through a common buss. Control of the multiple applications connected to the common bus can be by a common platform with packetized commands issued by a common master bus controller through the common bus. The common master bus controller replaces the individual interfaces/controllers and their dedicated busses. The AP chip can realize reduced number of pinouts in its chip packaging and therefore the physical size of the AP chip can be reduced. Processing by the CPU using a common platform through a common controller can be reduced, thereby reducing power consumption. FIG. 3 shows a block diagram of a communication device according to a preferred embodiment of the present invention. The illustrative communication device includes two IC chips—an Application Processor chip 310 and a modem chip 350—and a plurality of application modules disposed external to the two IC chips. The modem chip 350 includes a DSP 395 and modulator/demodulator circuit (not shown) for processing signals to effect wireless or radio communications with other compatible communication devices or base station. The AP chip 310 includes a CPU 311 which controls CPU associated internal functions such as DMA 312, bridge 313 and peripherals 314, 315 and 316. The DMA 312 can access memory devices (including a shared memory 375) for reading and/or writing independently of the CPU 311. The Peripherals 314, 315 and 316 can be a timer, a pulse width modulator, USB (Universal Serial Bus) device, I2C device and I2S device.

The CPU 311 operates multiple external applications such as camera module 330, 2D/3D engine 335, display 320, memory module 340, and shared memory 375 through a common bus 305. A bus master controller 380 controls the operations of the external application modules via the common bus 305. A common operating system platform including a common command structure is used. Preferably, the common command is packetized and each command includes a module selector signal to select one of the multiple modules under control. The command and module selection process will be further described below. A shared memory 375 is used for data communication between the modem chip 350 and the AP chip 310. The shared memory can be a dual-port SRAM, controlled by a memory controller (not shown) in the modem chip 350 or the application processor 310. According to the present embodiment, the shared memory 375 is preferably a synchronous SDRAM, and modem chip 350 uses a bus master controller 390 to control the shared memory 375. The bus master controllers 380 and 390 share a common command structure in communicating with shared memory 375. Interface to the shared memory 375 to/from either the AP chip 310 or the modem chip 350 is the same.

Figure 4:
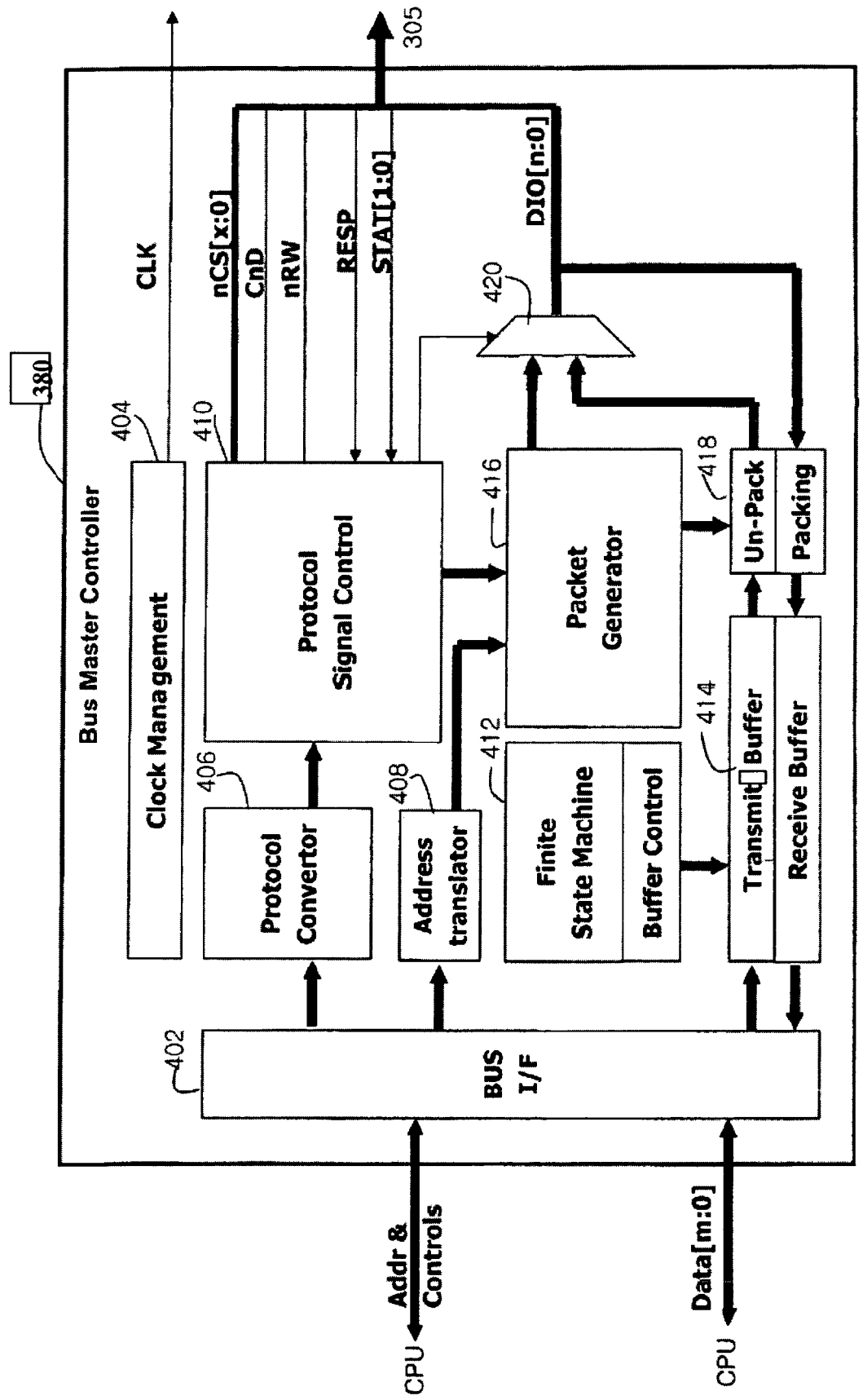
FIG. 4 shows a block diagram of a bus master controller of FIG. 1.

FIG. 4 shows a detailed block diagram of a bus master controller usable in the communication device of FIG. 3. The bus master controller 380 includes a bus interface 402 for data, control, and signal communication with the CPU. Protocol converter 406 and protocol signal control 410 manages data and control signal flow according to preset protocol. Clock management 404 receives and distributes clock signals for synchronizing the communication device including the external application modules. Address translator 408 receives address data from the CPU and translates the address depending on the application module to be accessed. The translated address is forwarded to packet generator 416, where the address is packetized in a command. The packet generator 416 also receives control signals from protocol signal control 410 for outputting data pursuant to protocol. Transmit and receive buffer 414 receives data from the CPU through the bus interface 402. A state machine buffer control 412 controls the state and timing of data transmit and receive of transmit and receive buffer 414 pursuant to the preset protocol. Data pack/unpack 418 is used to arrange the data according to specified width of the common data structure. A multiplexer 420 multiplexes address or data signals for outputting through bi-directional bus DIO[n:0]. Data is also read from external application modules through bi-directional bus DIO[n:0]. Protocol signal control 410 sends control signals nCS[x:0], CnD, and nRW and receives control signals RESP and STAT. The data and control signals are transmitted and received through the common bi-directional bus 305.

In operation, the bus master controller 380 acts as the master to control the application modules (slaves) which are connected to the bi-directional bus 305. Centralized commands issued by the master controller are received by the plurality of external slave devices. Control signals output by protocol signal control 410 includes slave select nCS, command CnD, read/write nRW. Data signals are output via DIO[n:0], which can be used to output either data or address signals. The master controller receives at the protocol signal control 410 acknowledged (STAT) and strobe (RESP) signals from a selected one of the plurality of external slave devices for signaling an acknowledgement of receipt of command from master controller 380 and for inputting data through DIO[n:0] under strobe control with strobe signal (RESP). The control and data signals are packetized by packet generator 416.

FIG. 7 lists further descriptions of the control signals of the common bus 305. A chip select signal, nCS, is used to select one of the external slave devices connected to common bus 305. Command signal, CnD, is used to signify whether the packet is a command packet or a data packet. Read/write signal, nRW, is used for signaling a read operation or a write operation. This signal is also used to control the direction of data flow on the data line DIO[n:0]. For example, a write operation signals that data is to be written to one of the selected external slave units and the data line DIO is directed outbound from the master controller. When nRW signals a read operation, signal is read from the selected one of the external slaves connected to the common bus 305 and the data lines DIO are directed inbound to be input into master controller 380. The command or data packets are synchronized using the synchronized clock CLK, which is also used to synchronize the external slave units. In a read operation, the selected external slave unit from which data is to be read inputs to the master controller 380 a strobe signal RESP, which is used for strobing the data read from the external slave device into the master controller 380. Upon receipt of a command packet by the selected external slave device, the selected external slave device sends an acknowledged signal, STAT, to the master controller for signaling that it has received the command packet.

FIG. 8 shows the illustrative command packet structure of commands issued from the bus master controller and FIG. 9 shows the descriptions for the command packet field. According to an illustrative embodiment of the present invention, the packet structure is preferably 4-bit wide and the first three locations of the packet 0, 1, 2 are used to specify field definitions and read/write operations. Address or data are included in the packet beginning at location 3. As shown in FIG. 9, field R is described as the field specifying the target of the current transaction. The master can access the internal registers of the slave device or the actual data which will be supplied by the slave device. Here, 0—access normal data; 1—access the internal register of the slave device. Field TY is the field specifying the type of the current transfer. 00—Read Transfer; 01—Reserved; 10—Write Transfer; 11—Reserved. Field CL specifies the length of the CMD Packet. 00—4×4-bit; 01—8×4-bit; 10—12×4-bit and 11—16×4-bit. Field DL specifies the size of the Data Packet. Data-Packet Size=$2^{DL}$ bytes (1, 2~32,768 bytes). Field $A_0$~$A_i$ specifies the start address of the requested transfer.

The external slave device selected by master controller 380 responds to the command by raising an acknowledged signal line STAT. The slave device has internal registers which includes mandatory registers or user defined registers. Data from the registers can be read by the master controller by a read command. Data read from the selected external device are strobed into a register (not shown) of master controller 380 from either the rising or falling edges of strobe signal RESP. FIG. 10 shows a representative internal register in a slave device and its data map.

Figure 11:
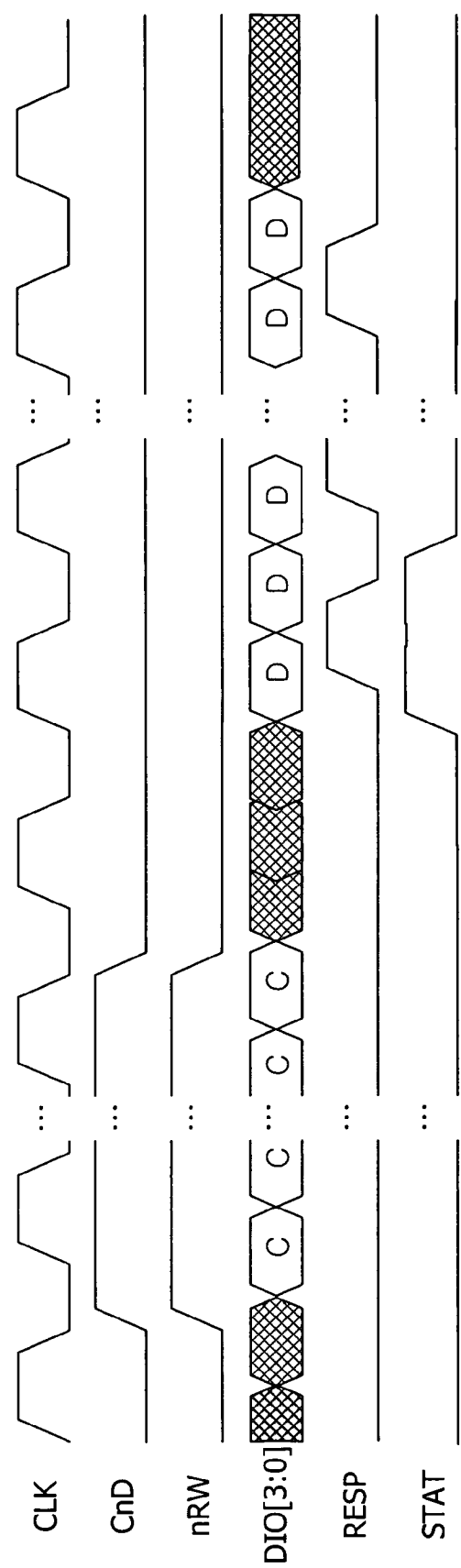
FIG. 11 shows a timing diagram of a read operation of data read from a slave device to a bus master controller.

FIG. 11 is a timing diagram for illustrating a representative read operation of data from a selected application module. As shown, bus master controller issues a clock signal CLK, a high CnD, signaling COMMANDS, and a high transfer signal nRW, signaling a read operation. Application module is selected by nCS (not shown). Commands are sent over the data line DIO[n:0]. As previously described, all control, address, or data signals are sent over the common bus 305. Upon receipt of the commands by the selected external slave device, the slave device sends an active acknowledge signal STAT to the bus master controller. Data is read from the selected external device and placed on data line DIO[n:0], along with strobe signal RESP. The data from data line DIO[n:0] is strobed into the bus master controller 380 using the strobe signals. The bus master controller 380 exercises full control of data transfer operations. For example, the bus master controller 380 can cancel a read operation in progress by issuing a new command or a different transfer command.

Figure 12:
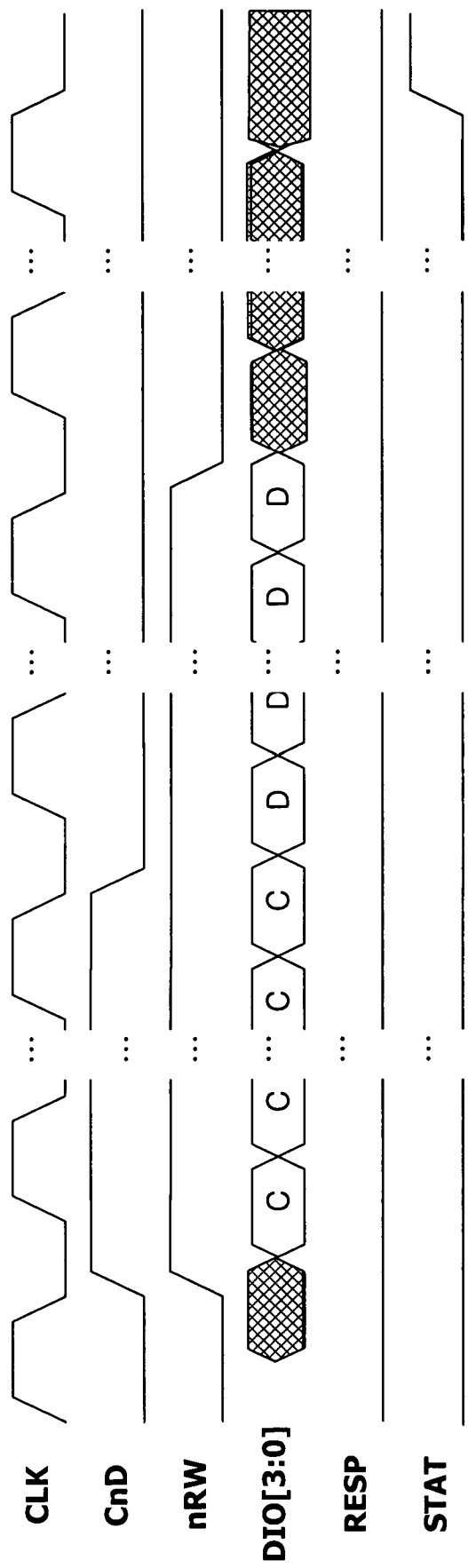
FIG. 12 shows a timing diagram of a data write command operation.

FIG. 12 is a timing diagram for illustrating a representative write operation of data from the AP chip 310 to a selected application module. As shown, under synchronization by clock signal CLK, bus master controller 380 issues command signal CnD and transfer signal nRW. Both command and address information are placed over data lines DIO[n:0] while the transfer signal nRW is held high. The target external application module connected to the common bus 305 is selected by nCS (not shown) and decodes the received commands, which includes the write signal and address data. Pursuant to preset protocol, such as after four command packets, data is sent from the bus master controller 380 over the common bus 305, data lines DIO[n:0] to be read into the internal register of the slave device. The selected slave device signals the receipt of the data packets by raising the acknowledge line STAT.

Figure 13:
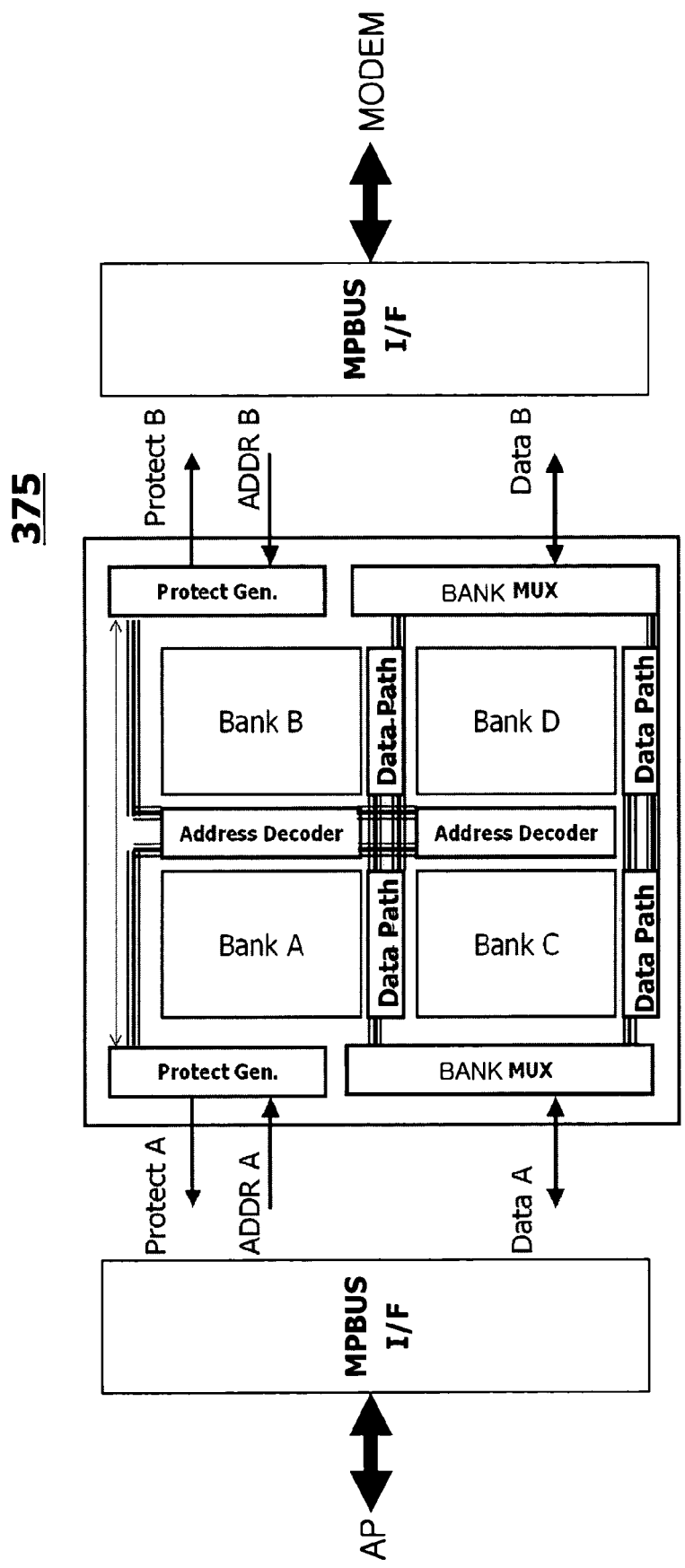
FIG. 13 shows a structure of a shared memory usable in a communication device according to the present invention.
Figure 14:
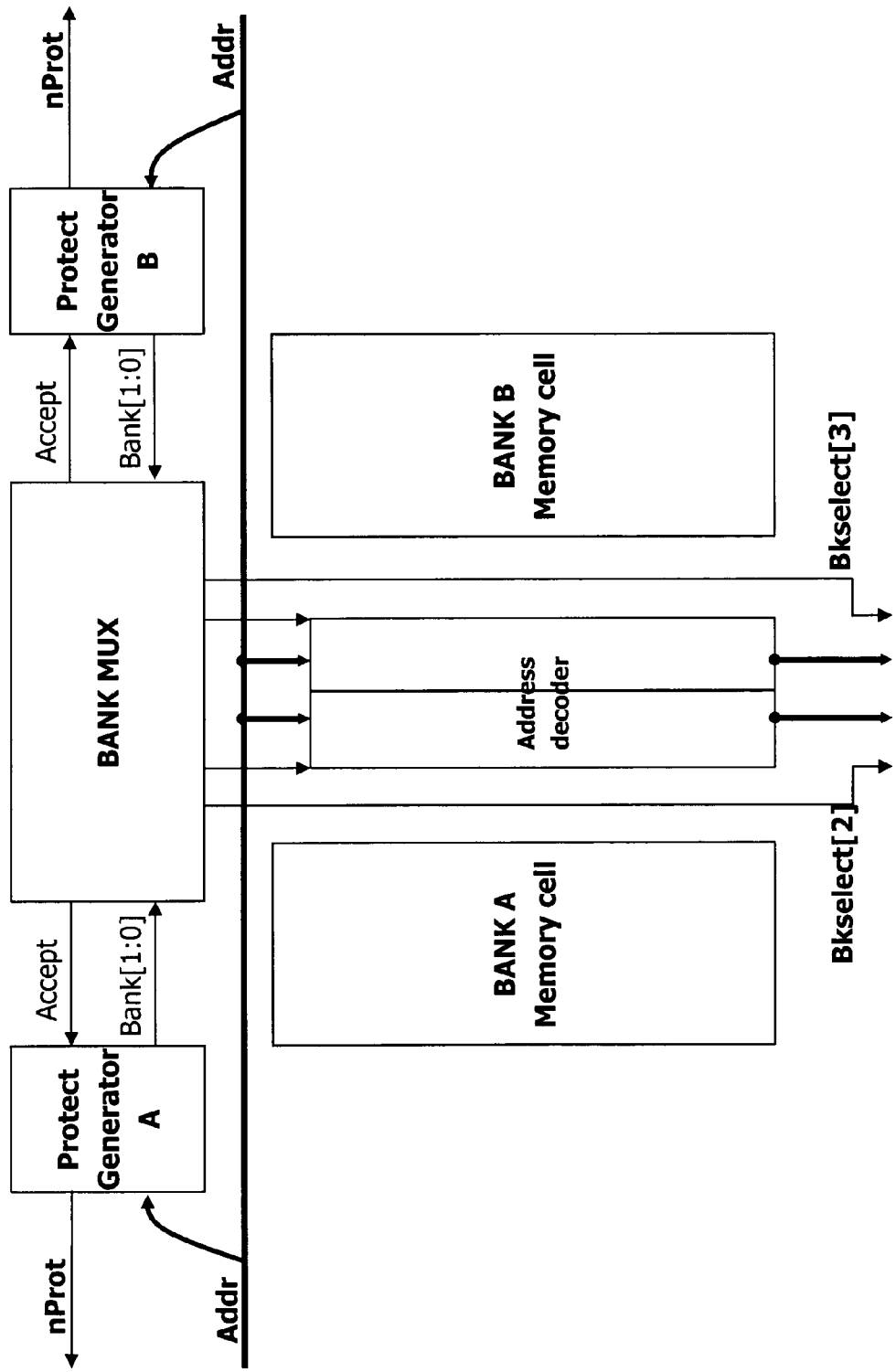
FIG. 14 shows a bank of memories cells of the shared memory with protection circuit.

According to a preferred embodiment of the present invention, the shared memory 375 used for data communication between the AP chip 310 and the modem chip 350 is also controlled by bus master controller 380. FIG. 13 shows a shared memory 375 usable in embodiments of the present invention. Shared memory 375 is preferably an SDRAM which includes a plurality of banks of memory cells, bank A, B, C and D. Each bank includes an associated address decoder, protect generator, and bank MUX, to be further described below. The shared memory 375 includes two ports A and B. Port A is connected to the bus master controller 380 of the AP chip 310 through a memory interface and the B port connects to the bus master controller 390 of the modem chip 350 through a second memory interface. FIG. 14 shows a more detailed block diagram of banks A and B with associated address decoder, bank MUX, and respective protect generator. The address line is commonly connected to and read by all the associated circuits, e.g., by bank MUX to identify which of the banks A and B memory cells are to be accessed. Each protect generator monitors the address lines of the respective ports A and B and upon detection of the same address at the same bank at both ports A and B, a protect signal NPROT is raised to signal a conflict situation. Memory access is halted during a raised NPROT condition to prevent simultaneous access of the same memory cells.

Figure 15:
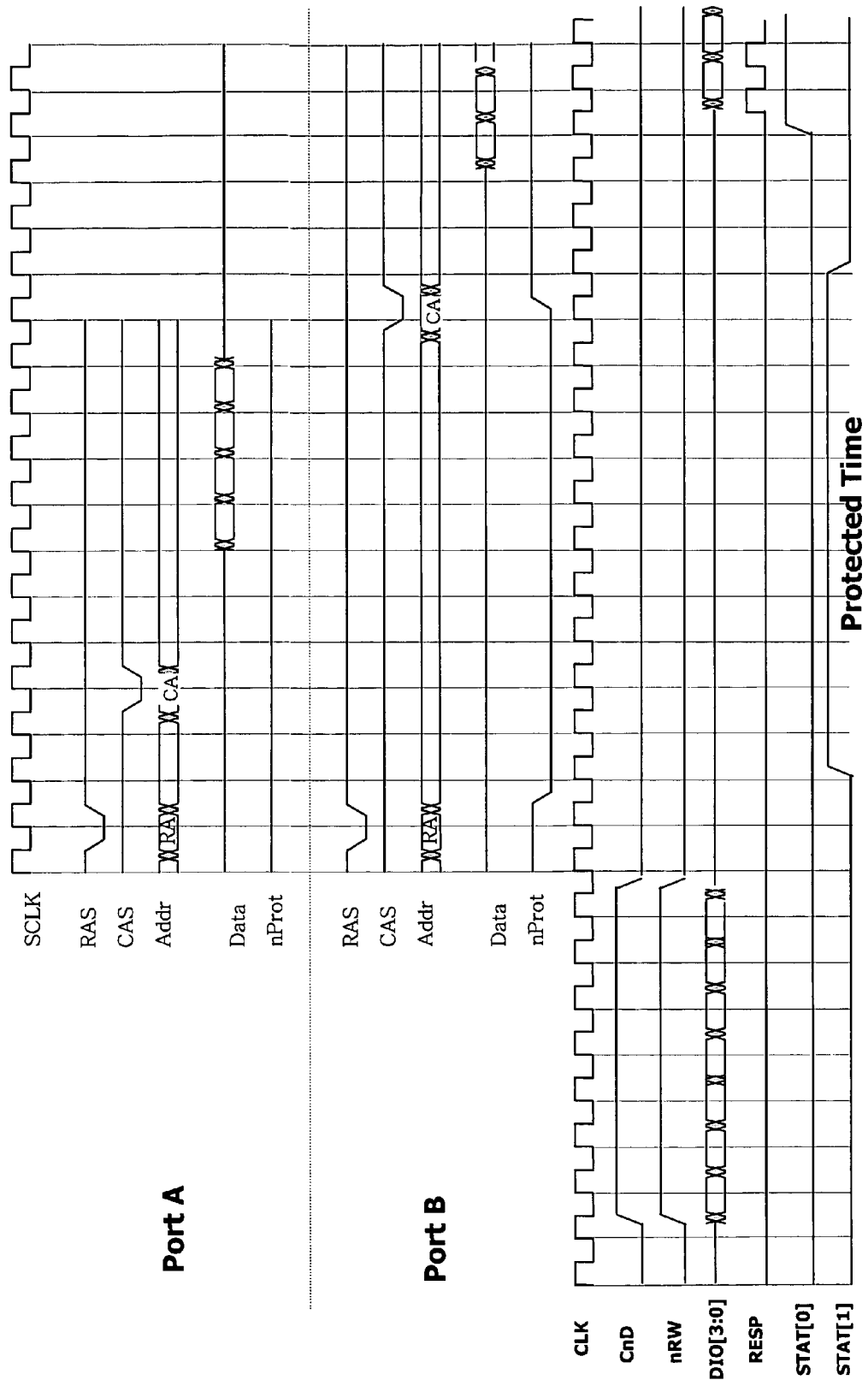
FIG. 15 shows a timing diagram of read and write operations of a shared memory according to the present invention.

FIG. 15 shows a timing diagram of a shared memory access operation according to a preferred embodiment of the present invention. The memory control signals (from memory interfaces A and B) including row address select signal RAS, column select signal CAS, Addresses, Data, and access conflict signal nProt are shown for Port A and Port B. Also shown are decoded memory access signals from bus master controller 380 of the AP chip 310 and bus master controller 390 of the modem chip 350. The timing diagram shows control signals CnD and nRW are raised to signal memory access, in this case, a read operation, along with packetized commands including addresses of memory to be accessed are sent over data lines DIO[n:0] of the common bus 305. Module select signal nCS (not shown) is set at the shared memory 375 as the target application module. Thus, the shared memory 375 is controlled using the same platform, command structure, and through the same common bus 305 as for any other external application module connected to the common bus 305.

The memory interfaces for ports A and B receive the module select signal nCS signifying the shared memory 375 is the selected application module to be accessed. The memory interface A extracts the address information from the packetized commands received from the bus master controllers 380 of the AP chip 310 over the common bus 305. The same process is performed at the bus master controller 390 of the modem chip 350 and memory interface B (not shown). The extracted addresses are received by address decoders of the memory banks, the bank mux, and the protect generators of shared memory 375. Referring again to FIG. 15, the address information are decoded as row addresses and column addresses. Here, both row address select signals at ports A and B are active (e.g., at low level), and the row address is the same at both ports A and B. Upon encountering the same address RA at both ports A and B, protection generator raises the nProt signal (e.g., high to low transition) at Port B, signaling a memory access conflict to the modem chip 350. The nProt signal at Port B acts to block the modem chip 350 from issuing an acknowledge signal STAT[0] to acknowledge receipt of the memory access command, and holds the strobe signal RESP[0] at inactive level. When RAS signals are no longer present at the same time, or when column address select signals CAS are not present at the same time at port A and port B, protect generator lowers the protection signal nProt, data is read from the shared memory 375. The acknowledge signal STAT[0] is raised at the memory interface B to signal receipt of the access command to the modem chip 350. The data read from the shared memory 375, along with active strobe signals RESP[0] are sent to the modem chip 350. It is preferred that the SDRAM, the protect generator, and interfaces for ports A and B are embedded on a single-chip integrated memory device.

By use of the master-slave, packetized command architecture, multiple applications can be operated via a centralized controller (master) through a common bus. Dedicated interfaces and busses for different application modules are eliminated. The pin count of the AP chip 310 is drastically reduced, thereby reducing the physical size of the AP chip 310. The CPU of the AP chip 310 also realizes reduced process overhead resulting from elimination of the dedicated interfaces/controllers. Further, the use of a common platform at the modem chip 350 facilitates synchronous access of the shared memory 375.

Figure 5:
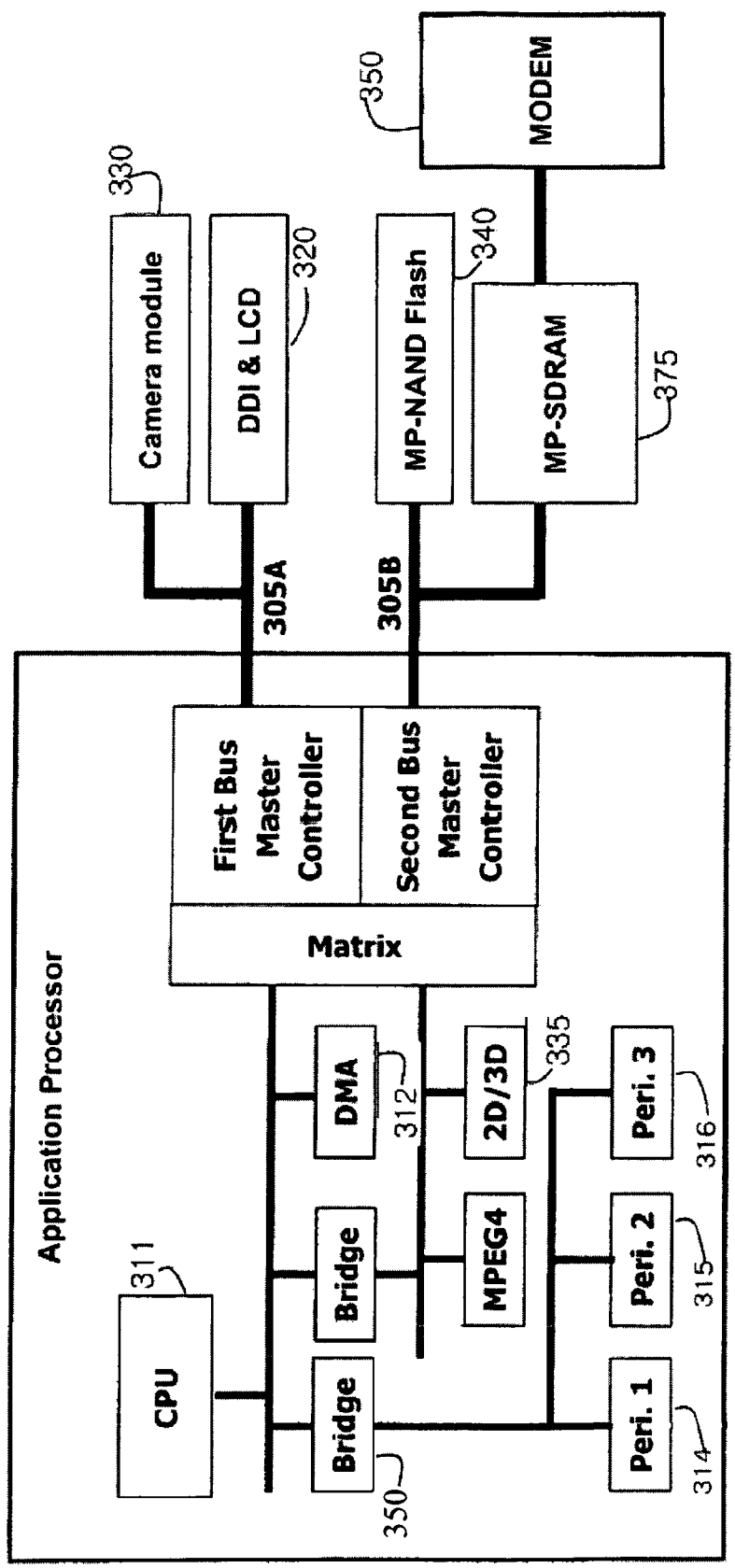
FIG. 5 shows a block diagram of a communication device according to another preferred embodiment of the present invention.

FIG. 5 shows another embodiment of the present invention wherein the common bus 305 is replaced by two common busses 305A and 305B. 305A is used for accessing external application modules such as cameras and displays and 305B is used for connecting to external memories such as flash memory and a shared memory. The configuration according to this embodiment facilitates common control of the external application modules other than memories through a common bus, as described above. A separate common bus 305B dedicated for memories allows more flexible memory control, or more memory intensive operations. According to the present embodiment, the shared memory can be a dual-port SDRAM, operated as described above. The shared memory can also be a dual-port SRAM, operated in the conventional manner in communication between the AP chip 310 and the modem chip 350. The use of two common busses also facilitates access of memories such as a flash memory while an external application such as a camera is controlled.

Figure 6:
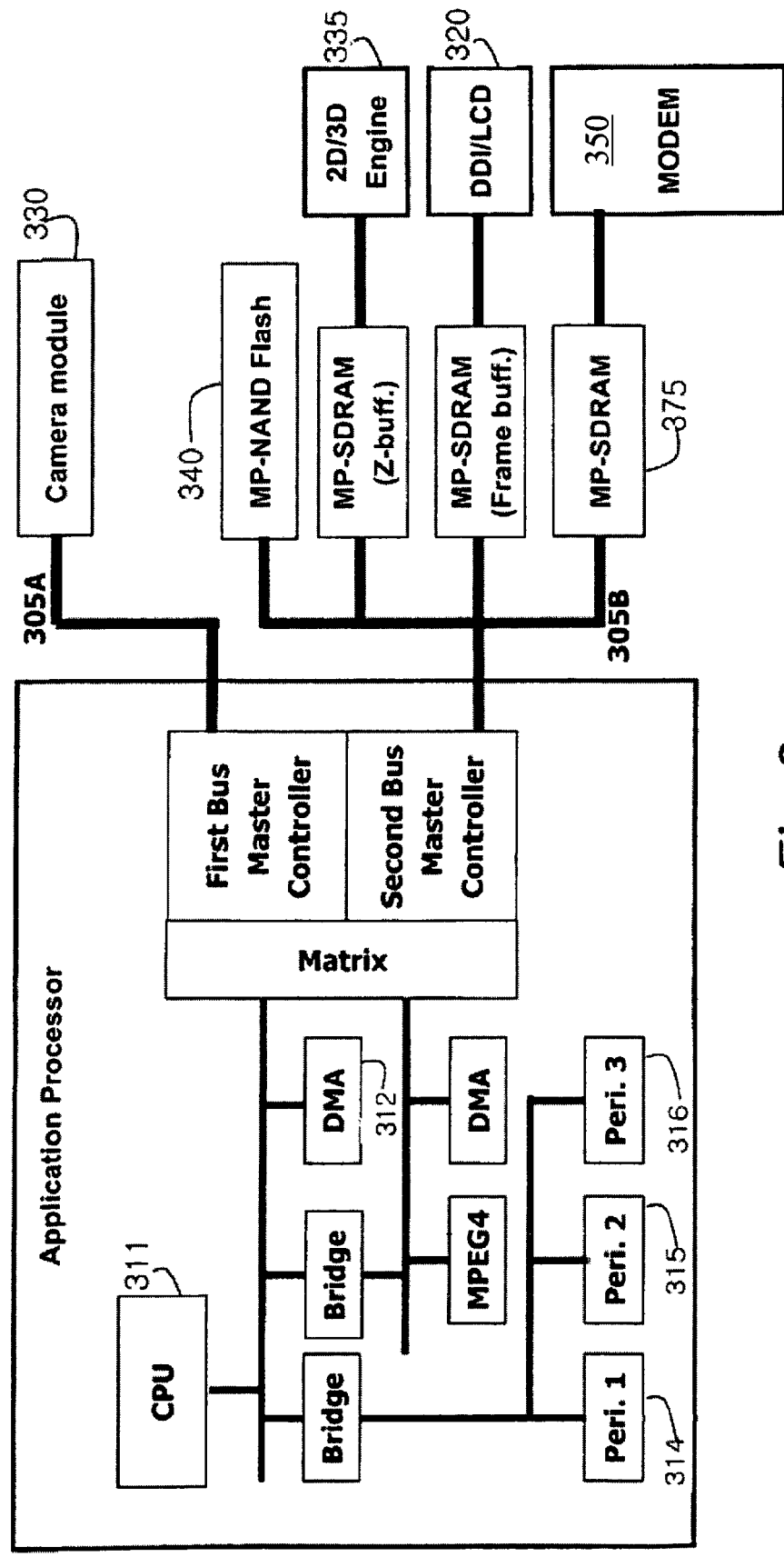
FIG. 6 shows a block diagram of a communication device according to another preferred embodiment of the present invention.

FIG. 6 shows still another preferred embodiment according to the present invention, wherein there are two common buses and common bus 305A is used exclusively for a process intensive application, such as a camera module. All other external modules including memory modules and the shared memory are connected to the other common bus 305B. Alternatively, the camera module, along with a flash memory are connected to common bus 305A. In such configuration, common bus 305A is dedicated for camera applications, including transfer of image data directly between the camera module and the flash memory.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

The invention claimed is:

1. A communication device, comprising:
    a signal modulator/demodulator (modem) having a digital signal processor for effecting radio communications;

a shared memory connected to the modem; and
an application processor (AP) having a central processing unit and a bus master controller for controlling via a common bus a plurality of external peripherals, the shared memory connected to the modem,
wherein the bus master controller controls the plurality of external peripherals and the shared memory by using a packet generator issuing a packet commonly receivable by the plurality of external peripherals and the shared memory over the common bus, and wherein the packet includes a module device select signal for selecting one of the plurality of external peripherals and the shared memory, and
wherein the bus master controller comprises:
 a bus interface for data, address, and control signal communication with the central processing unit;
 a protocol converter and protocol signal controller for receiving control signals from the central processing unit through the bus interface and managing control signal flow according to a present protocol;
 an address translator for receiving the address from the central processing unit through the bus interface and translating the address depending on an application module to be accessed;
 a packet generator for receiving control signals from the protocol converter and protocol signal controller and a translated address from the address translator and packetizing the control signals and the translated address in a command packet;
 a receive buffer for receiving data from the central processing unit through the bus interface;
 a data pack unit for arranging the received data according to a specified width of a common data structure; and
 a multiplexer for receiving the command packet from the packet generator and the data packet from the data pack unit and outputting one of the command packet or the data packet to the common bus.

2. The device of claim 1, wherein the shared memory is an SDRAM.

3. The device of claim 1, wherein the plurality of external peripherals includes at least one of an image capture module, a display, and a flash memory.

4. The device of claim 1, wherein the selected one of the plurality of external peripherals returns a signal to the bus master controller to acknowledge receipt of the command packet.

5. The device of claim 1, wherein the command packet includes:
 a read/write command directed to the shared memory shared by the modem and the AP.

6. The device of claim 5, wherein data read from the shared memory is sent to the AP via a second common bus with a strobe signal, and wherein the strobe signal is used for strobing the data read into a register in a second bus master controller.

7. The device of claim 2, wherein the SDRAM includes a plurality of data banks and an interface for interfacing a second bus master controller via a second common bus.

8. The device of claim 2, wherein the shared memory includes a first protection circuit for receiving address data from the AP and a second protection circuit for receiving address data from the modem, each for generating a protect signal upon simultaneously receiving the same address from the modem and the AP, wherein the protect signal is generated to halt memory access by one of the modem and the AP to prevent simultaneous access of the same memory cells.

9. A communication device, comprising:
 a signal modulator/demodulator (modem) having a digital signal processor for effecting radio communications;
 a shared memory connected to the modem; and
 an application processor (AP) having a central processing unit, a first bus master controller connected to a plurality of external peripherals via a first common bus and a second bus master controller connected to the shared memory via a second common bus,
 wherein the first bus master controller is configured for controlling via the first common bus the plurality of external peripherals,
 wherein the second bus master controller is configured for controlling via the second common bus the shared memory connected to the modem,
 wherein the first bus master controller controls the plurality of external peripherals operatively connected to the first common bus by issuing a packet commonly receivable by the plurality of external peripherals over the first common bus, and
 wherein the packet includes a module device select signal for selecting one of the plurality of external peripherals, and
 wherein the first bus master controller comprises:
  a packet generator for receiving control signals and an address, and packetizing the control signals and the address in a command packet;
  a data pack unit for packing data into a data packet; and
  a multiplexer for receiving the command packet from the packet generator and the data packet from the data pack unit and outputting one of the command packet or the data packet to the common bus;
  a protocol converter and protocol signal controller for receiving second control signals from the central processing unit through the bus interface and managing control signal flow according to a present protocol;
  an address translator for receiving a second address from the central processing unit through the bus interface and translating the second address into the address depending on an application module to be accessed; and
  a receive buffer for receiving the data from the central processing unit through the bus interface.

10. The device of claim 9, wherein at least one peripheral of the plurality of external peripherals is an image capture module.

11. The device of claim 9, wherein the selected one of the plurality of peripherals returns a signal over the first common bus to the first bus master controller in the AP to acknowledge receipt of the packetized command.

12. The device of claim 9, wherein data read from the shared memory is transmitted via the second common bus to the second bus master controller in the AP with a strobe signal, and wherein the strobe signal is for strobing the data read into a register in the second bus master controller.

13. The device of claim 9, wherein the shared memory is an SDRAM.

14. The device of claim 13, wherein the SDRAM includes a plurality of data banks and an interface for interfacing.

15. The device of claim 13, wherein
 the SDRAM includes a first protection circuit for receiving address data from the AP and a second protection circuit for receiving address data from the modem and for generating a protect signal upon simultaneously receiving the same address from the modem and the AP.

16. An application processor (AP), for use in a communication device, comprising:

a central processing unit for processing data received from a plurality of external peripherals and from a shared memory; and a bus master controller for controlling via a common bus the plurality of external peripherals and the shared memory; and wherein the shared memory is connected to a signal modulator/demodulator (modem), wherein the bus master controller controls the plurality of peripherals and the shared memory by issuing a packet commonly receivable by the plurality of external peripherals and the shared memory over the common bus, and wherein the packet includes a module device select signal used for selecting one of the plurality of external peripherals and the shared memory wherein the bus master controller comprises:

a bus interface for data, address, and control signal communication with the central processing unit;

a protocol converter and protocol signal controller for receiving control signals from the central processing unit through the bus interface and managing control signal flow according to a present protocol;

an address translator for receiving the address from the central processing unit through the bus interface and translating the address depending on an application module to be accessed;

a packet generator for receiving control signals from the protocol converter and protocol signal controller and a translated address from the address translator and packetizing the control signals and the translated address in a command packet;

a receive buffer for receiving data from the central processing unit through the bus interface;

a data pack unit for arranging the received data according to a specified width of a common data structure; and a multiplexer for receiving the command packet from the packet generator and the data packet from the data pack unit and outputting one of the command packet or the data packet to the common bus.

17. The device of claim 16, wherein the shared memory is an SDRAM.

18. The device of claim 16, wherein the plurality of external peripherals additionally includes at least one of an image capture module, a display, and a flash memory.

19. The device of claim 16, wherein the selected one of the plurality of external peripherals returns a signal to the bus master controller over the common bus to acknowledge receipt of the command packet.

20. The device of claim 16, wherein the data read from the shared memory is sent over a second common bus to the AP with a strobe signal, and wherein the strobe signal is used for strobing the read data into a register of a second bus master controller.

21. The device of claim 17, wherein the SDRAM includes a plurality of data banks and an interface for interfacing a second bus master controller.

22. The device of claim 17, wherein the SDRAM includes a first protection circuit for receiving address data from the AP over a second common bus and a second protection circuit for receiving address data from the modem and for generating a protect signal upon simultaneous receipt of the same address from the AP and the modem.

23. An application processor (AP) for use in a communication device comprising:

a central processing unit for processing data received from a plurality of external peripherals over a first common bus and from a shared memory over a second common bus; and a first bus master controller for controlling via the first common bus the plurality of external peripherals; and a second bus master controller for interfacing via the second common bus with the shared memory that is connected to a signal modulator/demodulator (modem), wherein the first bus master controller controls the plurality of external peripherals by issuing a packet commonly receivable by the plurality of external peripherals over the first common bus, and wherein the packet includes a module device select signal for selecting one of the plurality of external peripherals, and wherein the first bus master controller comprises:

a bus interface for data, address, and control signal communication with the central processing unit;

a protocol converter and protocol signal controller for receiving control signals from the central processing unit through the bus interface and managing control signal flow according to a present protocol;

an address translator for receiving the address from the central processing unit through the bus interface and translating the address depending on an application module to be accessed;

a packet generator for receiving control signals from the protocol converter and protocol signal controller and a translated address from the address translator and packetizing the control signals and the translated address in a command packet;

a receive buffer for receiving data from the central processing unit through the bus interface;

a data pack unit for arranging the received data according to a specified width of a common data structure; and a multiplexer for receiving the command packet from the packet generator and the data packet from the data pack unit and outputting one of the command packet or the data packet to the common bus.

24. The device of claim 23, wherein the shared memory is an SDRAM.

25. The device of claim 23, wherein the plurality of external peripherals includes at least one of an image capture module, a display, and a flash memory.

26. The device of claim 23, wherein the selected one of the peripherals returns a signal over the first common bus to the first bus master controller to acknowledge receipt of the command packet.

27. The device of claim 23, wherein the data read from the shared memory is sent to the AP over the second common bus with a strobe signal, and wherein the strobe signal is used for strobing the data read into a register in the second bus master controller.

28. The device of claim 24, wherein the SDRAM includes a plurality of data banks and an interface for interfacing with the second bus master controller over the second common bus.

29. A method of controlling a communication device having a signal modulator/demodulator (modem) for effecting radio communications, an application processor (AP) having a central processing unit, a bus master controller and a shared memory, the method comprising:

controlling via a common bus a plurality of external peripherals using the bus master controller; and interfacing with the modem via the shared memory and the common bus using the bus master controller,
wherein the step of controlling the plurality of external peripherals includes:
  receiving control signals from the central processing unit and managing control signal flow according to a present protocol, by using a protocol converter and protocol signal controller;
  receiving an address from the central processing unit and translating the address depending on the external peripheral to be accessed, by using an address translator;
  receiving control signals from the protocol converter and protocol signal controller and a translated address from the address translator and packetizing the control signals and the translated address in a command packet, by using a packet generator;
  receiving data from the central processing unit by using a receive buffer;
  arranging the received data according to a specified width of a common data structure, by using a data pack unit; and
  receiving the command packet from the packet generator and the data packet from the data pack unit and outputting one of the command packet or the data packet to the common bus, by using a multiplexer.

30. The method of claim 29, wherein the shared memory is an SDRAM.

31. The method of claim 29, wherein the step of controlling includes controlling at least one of an image capture module, a display, and a flash memory included in the plurality of external peripherals.

32. The method of claim 29, wherein the selected one of the plurality of external peripherals returns a signal to the bus master controller over the common bus to acknowledge receipt of the command packet.

33. The method of claim 29, wherein data read from the shared memory is transmitted over a second common bus to the AP with a strobe signal, and wherein the strobe signal is for strobing the data read into a register in a second bus master controller.

34. The method of claim 29, further including receiving address data from the AP over a second common bus and from the modem at the shared memory and generating a protect signal upon simultaneously receiving the same address from the modem and the AP.

* * * * *